US007948917B2

(12) United States Patent
Hilt et al.

(10) Patent No.: US 7,948,917 B2
(45) Date of Patent: May 24, 2011

(54) ROUTING INTERNET COMMUNICATIONS USING NETWORK COORDINATES

(75) Inventors: Volker Hilt, Middletown, NJ (US); Markus A. Hofmann, Fair Haven, NJ (US); Vasileios Pappas, Los Angeles, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1212 days.

(21) Appl. No.: 11/260,890

(22) Filed: Oct. 27, 2005

(65) Prior Publication Data

US 2007/0097951 A1    May 3, 2007

(51) Int. Cl.
*H04L 12/28* (2006.01)
(52) U.S. Cl. ....................................... 370/254
(58) Field of Classification Search .................... 370/254
See application file for complete search history.

(56) References Cited

U.S. PATENT DOCUMENTS

| | | | | |
|---|---|---|---|---|
| 2004/0109417 | A1* | 6/2004 | Castro et al. | 370/238 |
| 2004/0143666 | A1* | 7/2004 | Xu et al. | 709/227 |
| 2005/0063318 | A1* | 3/2005 | Xu et al. | 370/254 |
| 2005/0201405 | A1* | 9/2005 | Liu et al. | 370/432 |
| 2006/0007863 | A1* | 1/2006 | Naghian | 370/238 |
| 2006/0209717 | A1* | 9/2006 | Sharma et al. | 370/254 |

OTHER PUBLICATIONS

Pietzuch, P.; Ledlie, J.; Mitzenmacher, M.; Seltzer, M.; "Network-Aware Overlays with Network Coordinates", Jul. 4-7, 2006, Distributed Computing Systems Workshops, 2006. ICDCS Workshops 2006, 26th IEEE International Conference, pp. 12-12.*

Pietzuch, P.; Ledlie, J.; Mitzenmacher, M.; Seltzer, M.; "Supporting Network Coordinates on PlanetLab", 2005, Proceedings of the 2nd Conference on Real, Large Distributed Systems, vol. 2, pp. 4-4.*
Pappas, V.; "Coordinate-Based Routing for Overlay Networks", Aug. 13-16, 2007, Computer Communications and Networks, 2007. ICCCN 2007. Proceedings of 16th International Conference, pp. 704-711.*
Vivaldi: A Decentralized Network Coordinate System by Frank Dabek, Russ Cox, Frans Kaashoek, Robert Morris; MIT CSAIL, Cambridge, MA.
Predicting Internet Network Distance with Coordinates-Based Approaches by T.S. Eugene Ng and Hui Zhang, Carnegie Mellon University, Pittsburgh, PA 15213.
Resilient Overlay Networks by David G. Andersen, Hari Balakrishnan, M. Frans Kaashoek, Robert Morris, MIT Laboratory for Computer Science, Oct. 2001.
Resilient Overlay Networks by: David G. Andersen; Submitted to the Department of Electrical Engineering and Computer Science dated May 2001 (86 pages).
OverQoS: An Overlay based Architecture for Enhancing Internet QoS by Lakshminarayanan Subramanian, Ion Stoica, Hari Balakrishnan and Randy H. Katz.
SkipNet: A Scalable Overlay Network with Practical Locality Properties by Nicholas J.A. Harvey, Michael B. Jones, Stefan Saroiu, Marvin Theimer, Alec Wolman (14 pages).

* cited by examiner

*Primary Examiner* — Chirag G Shah
*Assistant Examiner* — Otis L Thompson, Jr.
(74) *Attorney, Agent, or Firm* — Carlson, Gaskey & Olds, PC

(57) ABSTRACT

A communication technique includes routing communications over an internet topology using coordinates, which correspond to estimated round trip times, of an origination, a destination and at least one intermediary host or node. A disclosed example includes identifying candidate intermediary nodes based upon selected criteria such as proximity to at least one of the origination or destination for the communication. A disclosed example includes identifying a plurality of intermediary nodes for some applications.

18 Claims, 2 Drawing Sheets

US 7,948,917 B2

ROUTING INTERNET COMMUNICATIONS USING NETWORK COORDINATES

FIELD OF THE INVENTION

This invention generally relates to communications. More particularly, this invention relates to internet communications.

DESCRIPTION OF THE RELATED ART

The internet is in widespread use for a variety of communication purposes. As such uses increase in variety and complexity, there is an increased need for improved communication abilities.

For example, overlay networks have been used to add functionality to the internet infrastructure. Overlay networks are useful, for example, for quality of service based routing and multicast routing. Overlay networks have also been used to build distributed applications such as distributed conferencing systems.

Even though many solutions have been built on overlay networks, little improvements have been made on the underlying principles of overlay routing. Most overlay networks employ routing schemes that mimic the routing algorithms of the underlying IP network. For example, resilient overlay networks (RON) use a link state protocol that is applied to a full mesh of overlay nodes. Typically, each node in an overlay network collects data about the paths to other overlay nodes and computes a routing table based on this information. Most overlay networks need to rely on such measurements between overlay nodes on a periodic basis. Monitoring such paths and maintaining routing tables is typically required to establish an overlay network. They do provide advantages in that they enable functionality that is not possible in straightforward IP network use. For example, with an overlay network it is possible to execute application code on an overlay node and to make routing decisions that are different from IP routing. At the same time, however, there are drawbacks.

Overlay networks introduce additional management overhead as they sit on top of the IP network and, therefore, are less efficient than straightforward IP use. There are significant costs associated with the measurements required for monitoring paths in an overlay network. That process consumes resources in the overlay nodes and creates a significant amount of traffic in the network. Additionally, full mesh overlay schemes are complex, which prevents them from being scaled onto large networks with many overlay nodes. A more efficient and scalable solution is needed.

Another known technique in internet communications is a network coordinate system that maps an internet topology to a synthetic coordinate system that is based on round trip times in the internet. The distance between the coordinates of two hosts is a prediction of the actual round trip time between those hosts in the internet. Such network coordinate systems have not been used for routing purposes.

There is a need for improved communications on the internet. This invention addresses that need while avoiding the drawbacks associated with prior attempts.

SUMMARY OF THE INVENTION

An exemplary method of communicating on the internet includes routing at least one communication from an origination to a destination through at least one intermediary node using synthetic coordinates of at least one of the origination or the destination and the at least one intermediary node, respectively.

Routing internet communications based on coordinates provides an enhanced ability to efficiently direct communications. This invention takes advantage of the prediction capability of coordinate systems for routing. Some example implementations of this invention are particularly useful in overlay networks to render them more scalable for larger implementations and to alleviate the cost associated with the measurements and maintenance issues of previously known overlay networks.

In one example, selecting the intermediary node is based upon whether the coordinates of that node satisfy a selected criteria. The selected criteria in one example comprises a distance in terms of the coordinates that minimizes a total distance from the origination to the at least one intermediary node and then from the at least one intermediary node to the destination.

One example includes selecting at least one intermediary node from a plurality of candidate nodes that have a preselected relationship with at least one of the origination or the destination. The preselected relationship in some examples comprises a selected geometric pattern in terms of the coordinate system that establishes a desired relationship between the candidate nodes and at least one of the origination or the destination.

One example internet communication system comprises a plurality of overlay network nodes. A routing table based on coordinates of the nodes establishes routing used for communications between two of the nodes through at least one other, intermediary one of the overlay network nodes.

The various features and advantages of this invention will become apparent to those skilled in the art from the following detailed description. The drawings that accompany the detailed description can be briefly described as follows.

DETAILED DESCRIPTION

Figure 1:
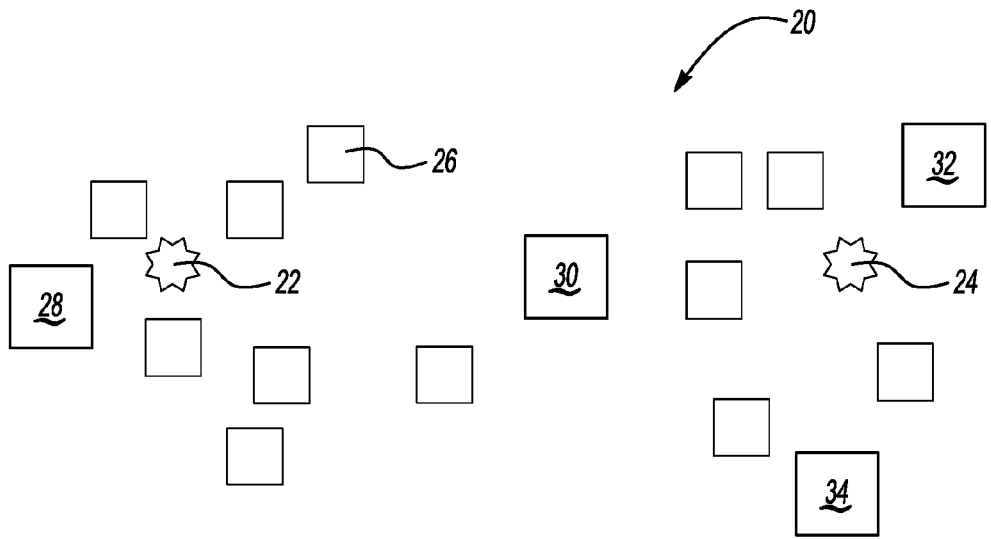
FIG. 1 schematically illustrates an example internet topology.

FIG. 1 schematically shows an example internet topology 20. An example internet communication occurs between an origination 22 and a destination 24. A plurality of hosts or nodes exist within the internet topology in a known manner. One example host is shown at 26.

The example of FIG. 1 also includes an overlay network having overlay nodes 28, 30, 32 and 34 established in a known manner. Communications on the internet topology 20 may involve one or more of the overlay nodes depending on the needs of a particular situation.

An example implementation of this invention includes using coordinate system coordinates, which can be established in a known manner, for routing communications on the internet topology. One example includes a multi-dimensional Euclidean coordinate space. The coordinate system in one example is based on round trip times between nodes in the internet. The distance between the coordinates of two hosts is a prediction of the actual round trip time between them in the internet. It is important to note that the coordinate system used in this example is a synthetic coordinate system, which is different from a geographical coordinate system. The latter is based on physical locations of a host. Prior to this invention, no one has used synthetic coordinate systems for routing communications on the internet. Using one of the example techniques of this description in an overlay network avoids the costly measurements associated with maintaining overlay networks.

Figure 2:
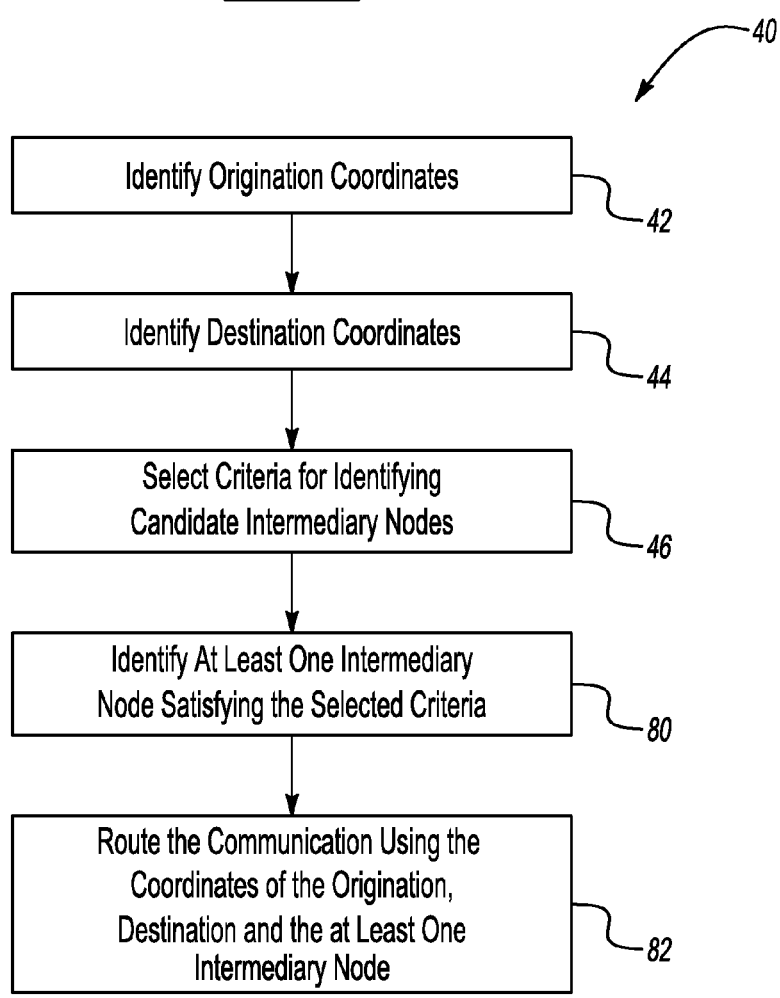
FIG. 2 is a flowchart diagram summarizing one example approach designed according to an embodiment of this invention.

FIG. 2 includes a flowchart diagram 40 that begins at 42 for using coordinates for routing an internet communication. The first step in the example of FIG. 2 at 42 includes identifying the origination coordinates. If the origination 22 is part of an overlay network, the coordinates will be predetermined and maintained as part of the overlay network information base (e.g., each node has its own coordinates and coordinates of at least some other nodes in the overlay network). At 44, the destination coordinates of the destination 24 are identified. The mapping of the internet topology 20 onto an appropriate coordinate system will allow for identifying those coordinates. In one example, the coordinates of the origination 22 and the destination 24 correspond to a roundtrip time between them in the internet. The source of the communication determines the coordinates of the destination 24 in one example using a resolution that maps the IP address of the destination 24 to the appropriate network coordinates. Such mapping is done in one example by carrying the information in a signaling protocol. Other examples use a data base look-up or DNS approach.

One example includes using at least one intermediary node or host between the origination 22 and the destination 24. This example includes at least one intermediary node or host. Some examples include a plurality of intermediary hosts or nodes between an origination and destination of a communication. For example, routing a communication over an expansive overlay network according to an embodiment of this invention may include routing through a plurality of nodes on the overlay network. The coordinate system based routing provides an efficient use of such internet resources.

Identifying candidate intermediary nodes may be accomplished in one of several ways. One example embodiment includes selecting criteria for identifying the candidate intermediary nodes. This is shown at 46 in FIG. 2.

Figure 3:
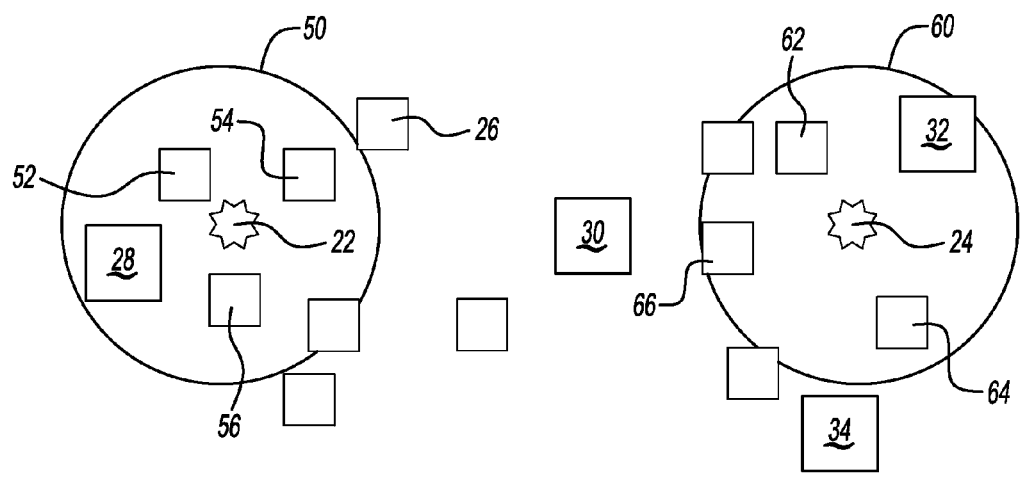
FIG. 3 schematically illustrates an example technique for identifying candidate intermediary nodes in an internet topology as shown in FIG. 1.

One example includes identifying intermediary nodes that are close in terms of the coordinates to at least one of the origination 22 or the destination 24. One technique for accomplishing this includes using a search pattern in terms of the coordinate system with the origination 22 or the destination 24 as the center of the search pattern. FIG. 3 schematically illustrates an arrangement where a search parameter circle 50 has the origination 22 as the center of the circle 50. In this example, the overlay network node 28 and the internet hosts 52, 54 and 56 are within the search criteria defined by the circle 50. In a situation where this example is used for routing on an overlay network, the node 28 could be selected as the intermediary node. In a situation where this example is being used for internet routing (other than on the illustrated overlay network), any one of the internet hosts 52, 54 and 56 may be selected and used as the intermediary node.

FIG. 3 also schematically shows a search criteria circle 60 having a destination 24 as the center of that circle. In the example of FIG. 3, the overlay network node 32 is a candidate intermediary node because it is within the circle 60. Likewise, the internet hosts 62, 64 and 66 qualify as candidate intermediary nodes.

Figure 4:
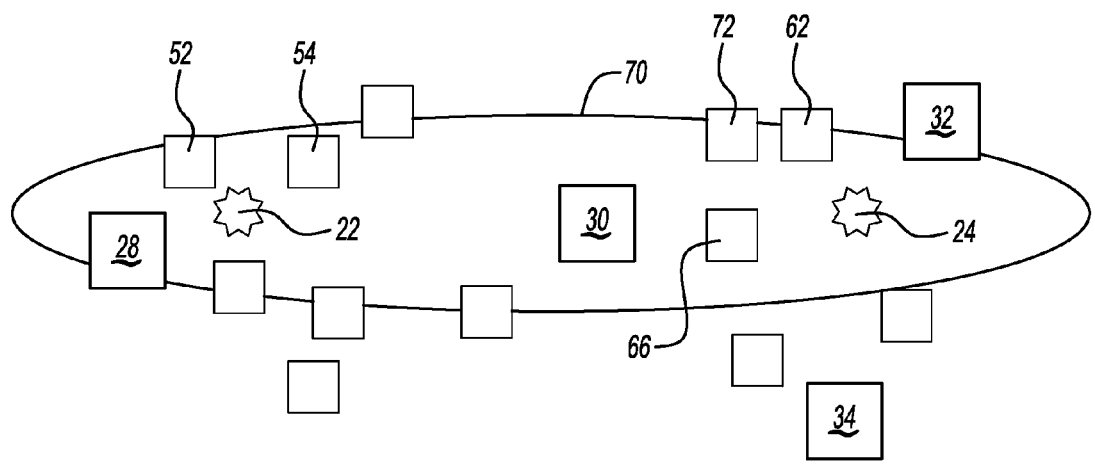
FIG. 4 schematically illustrates another technique for identifying candidate intermediary nodes.

FIG. 4 schematically shows another example strategy for identifying candidate intermediary nodes. In this example, the selected criteria include having intermediary nodes that are equally distant from the origination 22 and the destination 24. In this example, the routing scheme seeks to identify candidate intermediary nodes that are within an ellipse 70 having the origination 22 and the destination 24 at the foci points of the ellipse 70. In the example of FIG. 4, the overlay network nodes 28 and 30 are within the plurality of candidate overlay network nodes for overlay network routing. The internet hosts 52, 54, 62, 66 and 72 are within the selected criteria to qualify as candidate intermediary nodes for internet routing.

One example includes selecting at least one of the candidate intermediary nodes to be used as the intermediary node for the communication between the origination 22 and the destination 24. One example includes determining the distance from the origination 22 to each candidate intermediary node and then from the candidate intermediary nodes to the destination 24 in terms of the coordinate system. The minimum distance of the determined total distances identifies which of the candidate intermediary nodes to use for routing that particular communication. This occurs at 80 in FIG. 2. Once the at least one intermediary node has been identified and selected, the communication is transmitted between the origination, the at least one intermediary node and the destination at 82 in FIG. 2 using standard internet communication techniques.

In some examples, there will be more than one intermediary node between the origination and the destination for routing a particular communication. The same process for identifying the first intermediary node may be used for identifying a second (or more in some examples) intermediary node. One example includes using one of the previously described techniques for identifying a second intermediary node considering the first identified intermediary node as the "origination" and the destination as the destination. One example includes identifying multiple intermediary nodes recursively in this manner.

In some examples, different processes or different selection criteria are used for identifying different ones of the intermediary nodes to be used for routing a particular communication. For example, one of the intermediary nodes may be selected based upon having a short distance in coordinate terms from the origination 22 or the destination 24. Such nodes have a short distance to their co-located node. Another example approach includes identifying nodes that are close to the source and the destination. Another approach includes identifying nodes that are in the middle between the origination 22 and the destination 24.

Another example implementation of this invention includes forming application level multicast trees based upon the use of coordinates for routing. One example includes using a known clustering algorithm (e.g., k-means or hierarchical) that classifies nodes into different groups with the property that nodes that belong to the same group are close to each other in respect to the coordinate space. Each group includes a centroid. The node that is closest to the position of the centroid is located and considered the cluster-head of the group. Consequently, all nodes in a group are connected to the cluster-head of the group.

One example includes using the clustering algorithm again with the cluster-heads, only, to arrange them into groups. A new cluster-head of each of the new groups can then be determined as above. This process repeats until all of the participating nodes are connected.

One example includes modifying the algorithm for constructing multi-layer multicast trees by creating a full connected mesh within each cluster and allowing only cluster-heads to forward traffic to other cluster-heads.

As can be seen from this description, network coordinate systems provide an efficient and scaleable way to route IP traffic. The example embodiment takes advantage of the prediction of distances between two hosts or nodes provided by a coordinate system for routing communications. The example techniques can be useful to determine the distance between a potentially large number of hosts where measuring the round trip times between all hosts would involve prohibitively high cost. In the disclosed examples, each overlay network node and each host is assigned to a certain coordinate in a space, for example, such that the coordinates map the network distance between any two of the nodes or hosts. In other words, the network coordinate system provides a multi-dimensional map of the internet topology that embeds (as accurately as possible) distances between the hosts. The coordinate-based routing of example implementations of this invention does not depend on the type of coordinate system.

Executing routing decisions within a coordinate system is a fundamentally different approach compared to existing applications of coordinate systems where implementation of a routing algorithm is orthogonal to the existence of network coordinates. Given this description, those skilled in the art will be able to make routing decisions within a coordinate based routing scheme designed according to an embodiment of this invention to meet the needs of their particular situation. For example, a multicast overlay routing scheme will route traffic along a different path than a routing scheme that minimizes unicast end-to-end delay. Coordinate based overlay routing designed according to this invention provides flexibility for implementing different routing schemes for different applications utilizing the same system of network coordinates. Some examples are particularly useful for routing in overlay networks.

It is recognized that there are prediction errors inherent to coordinate systems. The identified intermediary node determined based on the network coordinates as described above may not always necessarily be the best node in the real internet topology. For some situations, an example implementation of this invention includes performing parallel measurements to the plurality of identified nodes (or at least a select first K of such nodes) to identify the one that provides the shortest path in coordinate terms. Situations where such parallel measurements may be useful include applications with relatively long lasting flows such as voice over internet protocol calls or file transfers, for example.

One example includes selecting at least four nodes to significantly increase the chances that the shortest path will be identified. It has been shown in an example simulation that when at least four nodes are selected, the chances of identifying the shortest path in coordinate terms are such that the shortest path will be identified in more than 60% of such cases. By contrast, a random selection of an intermediate node cannot identify a closest node in even 5% of such cases.

As can be appreciated from the preceding description, utilizing coordinate based routing provides more efficient overlay routing on the internet. Additionally, overlay networks can be implemented on a much broader scale because the coordinate based routing technique reduces the cost associated with the types of measurements otherwise required for maintaining overlay networks.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating on the internet, comprising
   routing at least one communication from an origination to a destination through at least one intermediary node using synthetic coordinates of at least one of the origination or the destination and synthetic coordinates of the at least one intermediary node, wherein the synthetic coordinates and the routing are independent of a physical location of the nodes; and
   selecting the at least one intermediary node from a plurality of candidate nodes that have a preselected relationship with at least one of the origination or the destination, wherein the preselected relationship comprises the candidate nodes being within a selected pattern in a corresponding coordinate space including the at least one of the origination or the destination in terms of the coordinates.

2. The method of claim 1, comprising
   determining the coordinates of the at least one intermediary node and the destination.

3. The method of claim 2, wherein the coordinates of the origination are known and comprising selecting the intermediary node based upon the determined coordinates of the at least one intermediary node satisfying a selected criteria.

4. The method of claim 3, wherein the selected criteria comprises a distance in terms of the coordinates that minimizes a total distance from the origination to the at least one intermediary node and from the at least one intermediary node to the destination.

5. The method of claim 3, wherein the selected criteria comprises a minimized round trip time between the origination and the destination.

6. The method of claim 1, wherein the selected pattern comprises an ellipse having the origination and the destination as the foci of the ellipse.

7. The method of claim 1, wherein the selected pattern comprises a circle having the origination as the center.

8. The method of claim 1, wherein the selected pattern comprises a circle having the destination as the center.

9. The method of claim 1, comprising selecting a plurality of intermediary nodes.

10. The method of claim 1, comprising selecting the at least one intermediary node such that it is at least one of close to the origination in terms of the coordinates, close to the destination in terms of the coordinates, between the origination and the destination in terms of the coordinates or close to both of the origination and the destination in terms of the coordinates.

11. The method of claim 1, wherein at least the intermediary node is part of an overlay network.

12. The method of claim 11, wherein each of the origination, destination and the intermediary node are part of an overlay network.

13. The method of claim 1, comprising
    selecting a plurality of candidate intermediary nodes;
    measuring a communication travel time between each of the selected candidate intermediary nodes and at least one of the origination or the destination; and
    identifying a most desired intermediary node from the selected plurality based at least in part on the measured times.

14. The method of claim 1, wherein the routing comprises multicast routing.

15. The method of claim 1, comprising
establishing a multicast tree using the synthetic coordinates; and
allowing cluster-heads of the multicast tree to forward communications only to other cluster-heads of the multicast tree.

16. A method of communicating on the internet, comprising
routing at least one communication from an origination to a destination through at least one intermediary node using synthetic coordinates of at least one of the origination or the destination and synthetic coordinates of the at least one intermediary node;
grouping a plurality of nodes into a plurality of groups that each have a centroid such that the nodes within one of the groups are close to each other in terms of the synthetic coordinates;
determining a centroid of each of the groups;
determining which of the nodes within each group is closest to the centroid in terms of the synthetic coordinates; and
using the determined closest node in each group as a cluster-head of the corresponding group.

17. The method of claim 16, comprising
grouping a plurality of the cluster-heads into a plurality of second groups that each have a centroid such that the cluster-heads within one of the groups are close to each other in terms of the synthetic coordinates;
determining a centroid of each of the second groups;
determining which of the cluster-heads within each second group is closest to the corresponding centroid in terms of the synthetic coordinates; and
using the determined closest cluster-head in each second group as a second cluster-head of the corresponding second group.

18. The method of claim 17, comprising repeating the grouping and determining steps until all participating nodes are connected in a multicast tree.

* * * * *